(12) United States Patent
Lee et al.

(10) Patent No.: US 11,120,544 B2
(45) Date of Patent: Sep. 14, 2021

(54) DISPLAY PANEL INSPECTION SYSTEM, INSPECTION METHOD OF DISPLAY PANEL AND DISPLAY PANEL USING THE SAME

(71) Applicant: SAMSUNG DISPLAY CO., LTD., Yongin-si (KR)

(72) Inventors: Hyungjin Lee, Yongin-si (KR); Dae Hong Kim, Yongin-si (KR); Minjung Park, Yongin-si (KR); Sung Hoon Yang, Yongin-si (KR); Seyoon Oh, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 90 days.

(21) Appl. No.: 16/574,332

(22) Filed: Sep. 18, 2019

(65) Prior Publication Data
US 2020/0126203 A1   Apr. 23, 2020

(30) Foreign Application Priority Data
Oct. 18, 2018   (KR) .................. 10-2018-0124481

(51) Int. Cl.
*G06T 7/00*   (2017.01)
(52) U.S. Cl.
CPC .... *G06T 7/001* (2013.01); *G06T 2207/30121* (2013.01); *G06T 2207/30141* (2013.01); *G06T 2207/30204* (2013.01)
(58) Field of Classification Search
CPC . G06T 2207/30121; G06T 2207/30141; G06T 2207/30204; G06T 7/001
See application file for complete search history.

(56) References Cited

U.S. PATENT DOCUMENTS 6,583,854 B1 *   6/2003   Hazama ............... G03F 7/70358
                                                                    355/53
6,614,923 B1 *   9/2003   Shishido ................. G06T 5/006
                                                                    382/144

(Continued)

FOREIGN PATENT DOCUMENTS

KR   10-0899146 B1   5/2009
KR   10-0969349 B1   7/2010

(Continued)

OTHER PUBLICATIONS

David E. Moreno-Villamarin "Statistics of Natural Fused Image Distortions" ICASSP 2017.

*Primary Examiner* — Ian L Lemieux
(74) *Attorney, Agent, or Firm* — Kile Park Reed & Houtteman PLLC (57) ABSTRACT

A display panel inspection system includes a camera to image respective frames of a mother substrate in a frame-by-frame manner, a stage to move the mother substrate relative to the camera, an image obtaining unit to store frames imaged by the camera, a gray level extracting unit that obtains gray level values of the frames, a frame matching unit that searches and matches two frames that match each other among the frames imaged by the camera, a correcting unit that performs correction on one of two frames matched with each other in consideration of an alignment error and an image distortion between the two frames, and a comparing unit that compares the gray level values of the two frames matched with each other, after the correction.

20 Claims, 6 Drawing Sheets

(56) References Cited

U.S. PATENT DOCUMENTS

| | | | | |
|---|---|---|---|---|
| 6,947,587 | B1* | 9/2005 | Maeda | G01N 21/95607 |
| | | | | 382/144 |
| 7,796,804 | B2* | 9/2010 | Bhaskar | G06T 7/001 |
| | | | | 382/145 |
| 9,495,736 | B2* | 11/2016 | Kawabata | G06F 16/583 |
| 9,523,735 | B2* | 12/2016 | Zeise | G01R 31/2808 |
| 9,799,098 | B2* | 10/2017 | Seung | G06K 9/342 |
| 2005/0156513 | A1* | 7/2005 | Sano | H01L 51/5256 |
| | | | | 313/504 |
| 2007/0053582 | A1* | 3/2007 | Yamashita | G06K 9/6203 |
| | | | | 382/151 |
| 2011/0311132 | A1* | 12/2011 | Meimoun | G01J 9/00 |
| | | | | 382/162 |
| 2015/0041793 | A1* | 2/2015 | Chan | H01L 51/56 |
| | | | | 257/40 |
| 2015/0348914 | A1* | 12/2015 | Takazawa | G03F 9/7084 |
| | | | | 257/435 |
| 2016/0093684 | A1* | 3/2016 | Youk | H01L 51/5246 |
| | | | | 257/40 |
| 2016/0363791 | A1* | 12/2016 | Lee | G01N 21/95 |
| 2017/0122890 | A1* | 5/2017 | Inoue | H01J 37/28 |
| 2017/0263564 | A1* | 9/2017 | Kim | H01L 51/0012 |
| 2017/0345725 | A1* | 11/2017 | Hu | G06T 7/001 |
| 2018/0203164 | A1* | 7/2018 | Yamamoto | G02B 3/0068 |
| 2019/0250447 | A1* | 8/2019 | Abe | G02F 1/13458 |
| 2020/0160496 | A1* | 5/2020 | Inoue | G06T 7/11 |

FOREIGN PATENT DOCUMENTS

| | | |
|---|---|---|
| KR | 10-1745883 B1 | 6/2017 |
| KR | 10-2017-0079828 A | 7/2017 |
| KR | 10-2018-0030385 A | 3/2018 |

* cited by examiner

DISPLAY PANEL INSPECTION SYSTEM, INSPECTION METHOD OF DISPLAY PANEL AND DISPLAY PANEL USING THE SAME

CROSS-REFERENCE TO RELATED APPLICATION

Korean Patent Application No. 10-2018-0124481, filed on Oct. 18, 2018, in the Korean Intellectual Property Office, and entitled: "Display Panel Inspection System, Inspection Method of Display Panel and Display Panel Using the Same," is incorporated by reference herein in its entirety.

BACKGROUND

1. Field

Embodiments relate to a display panel inspection system, an inspection method of a display panel, and a display panel manufactured using the display panel inspection system and the inspection method.

2. Description of the Related Art

Recently, a display apparatus having light weight and small size has been manufactured. A cathode ray tube (CRT) display apparatus has been used due to a performance and a competitive price. However the CRT display apparatus has a weakness with a size or portability. Therefore a display apparatus such as a plasma display apparatus, a liquid crystal display apparatus, and an organic light emitting display apparatus has been highly regarded due to small size, light weight and low-power-consumption.

SUMMARY

Embodiments are directed to a display panel inspection system, including a camera to image respective frames of a mother substrate in a frame-by-frame manner, a stage to move the mother substrate relative to the camera, an image obtaining unit to store frames imaged by the camera, a gray level extracting unit that obtains gray level values of the frames, a frame matching unit that searches and matches two frames that match each other among the frames imaged by the camera, a correcting unit that performs correction on one of two frames matched with each other in consideration of an alignment error and an image distortion between the two frames, and a comparing unit that compares the gray level values of the two frames matched with each other, after the correction.

In an example embodiment, the camera may be a line scan camera, and may be configured to obtain a plane image of the mother substrate, so that a plurality of frames may be photographed by the camera so as to correspond to an entire inspection region of the mother substrate.

In an example embodiment, the gray level extracting unit may generate the gray level values of the images by gray-valuing images obtained by the image obtaining unit.

In an example embodiment, the mother substrate may include a plurality of alignment marks, and wherein the frame matching unit matches two frames having the same alignment mark.

In an example embodiment, the comparing unit may compare the gray level values of the images of the corrected two frames and determines that a defect has occurred in a portion having a gray value having a difference larger than a predetermined threshold value.

In an example embodiment, the mother substrate may be a substrate including a plurality of cells, each of the cells is cut to form one display panel. A plurality of alignment marks may be formed in one cell, and the alignment marks in the one cell have different shapes.

In an example embodiment, the correcting unit may correct the frame and the image distortion by linear interpolation using the alignment mark on the mother substrate.

In an example embodiment, the correcting unit may use the following equation.

$$dX2=(dY2*dX1)/dY1 \qquad \text{<Equation>}$$

(dX1: a distance in a first direction (X-direction) between the corresponding two alignment marks,
dY1: a distance in a second direction (Y-direction) between the corresponding two alignment marks,
dY2: a distance in the second direction between two comparison points in the frame,
dX2: a correction amount in the first direction of one of the comparison points)

Embodiments are also directed to a inspection method of a display panel that includes obtaining inspection image step for photographing a mother substrate to be inspected frame-by-frame, and storing images of frames which are photographed, extracting a grey level value step for obtaining gray level values by gray-scaling the image of each of the frames, matching frames step for searching for and matching two frames that match each other among the frames, correcting step for correcting any one of the two frames which are matched with each other in consideration of an alignment error and an image distortion between the two frames, and comparing step for determining whether a defect has occurred by comparing the gray level values of the images of the two frames that have been corrected.

In an example embodiment, a plurality of alignment marks having various shapes may be formed on the mother substrate.

In an example embodiment, in the frame matching step, two frames including the alignment marks having the same shape may be matched.

In an example embodiment, in the comparing step, the gray level values of the images of the two frames may be compared to determine that the defect has occurred where a gray level value having a difference greater than a preset threshold value.

In an example embodiment, in the obtaining inspection image step, a camera may be used to photograph the mother substrate in a line scan manner.

In an example embodiment, the mother substrate may be a substrate including a plurality of cells, each of the cells is cut to form one display panel. A plurality of alignment marks may be formed in one cell, and the alignment marks in the one cell have different shapes.

In an example embodiment, in the matching frames step, a frame in one cell of the mother substrate and a frame in another cell of the mother substrate may be matched with each other.

In an example embodiment, in the matching frames step, two frames in one cell of the mother substrate may be matched with each other.

In an example embodiment, in the correcting step, the following equation may be used to correct.

$$dX2=(dY2*dX1)/dY1 \qquad \text{<Equation>}$$

(dX1: a distance in a first direction (X-direction) between the corresponding two alignment marks, dY1: a distance in a second direction (Y-direction) between the corresponding two alignment marks, dY2: a distance in the second direction between two comparison points in the frame, dX2: a correction amount in the first direction of one of the comparison points)

Embodiments are also directed to a display panel that includes a substrate on which a circuit pattern is formed, and a plurality of alignment marks arranged at predetermined intervals along a first direction on the substrate.

In an example embodiment, the circuit pattern may include has repeated portions, so that at least two portions of the circuit pattern may have the same shapes. The repeated portions may be formed with alignment marks of the same shape.

In an example embodiment, the alignment marks may have different shapes.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

Figure 1:
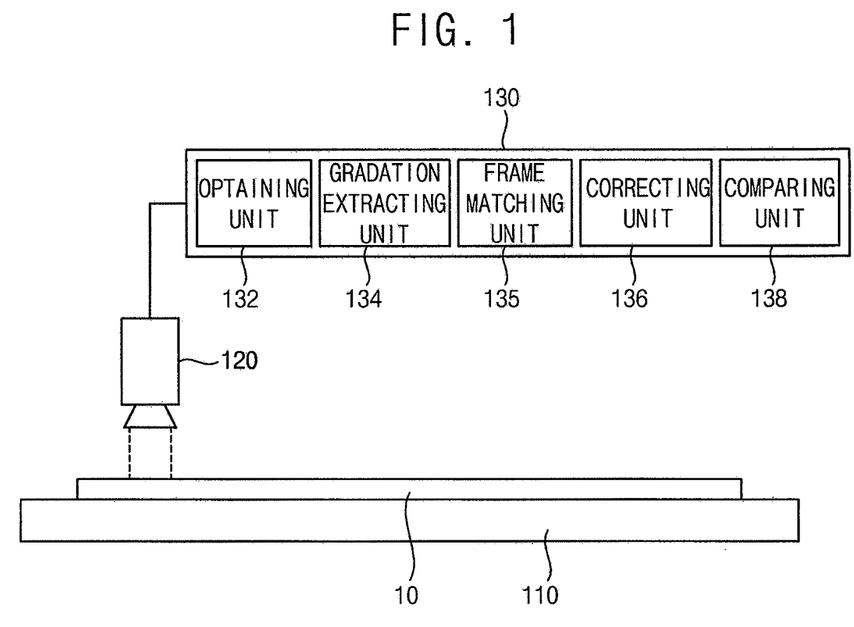
FIG. 1 illustrates a schematic diagram of a display panel inspection system according to an example embodiment.

FIG. 1 is a schematic diagram of a display panel inspection system according to an example embodiment.

Referring to FIG. 1, the display panel inspection system may include a stage 110, a camera 120, and a processing unit 130. The processing unit 130 may include an image obtaining unit 132, a gray level extracting unit 134, a frame matching unit 135, a correcting unit 136, and a comparing unit 138.

The stage 110 may move the mother substrate 10 to be inspected relative to the camera 120. Thus, the stage 110 may relatively move the mother substrate 10 relative to the camera in a X-axis direction (see D1 in FIG. 2) and a Y-axis direction (see D2 in FIG. 2).

The mother substrate 10 may be a substrate to be inspected by the display panel inspection system and may include a plurality of cells before being cut. Each of the cells may constitute one display panel. (see the description of FIG. 6)

The camera 120 may capture a plane image of the mother substrate 10. The camera 120 may take a frame of the mother substrate 10 frame-by-frame. One frame is a planar image corresponding to a portion of the mother substrate 10. A plurality of frames may be photographed so as to correspond to the entire inspection region of the mother substrate 10. For example, the camera 120 may be a line scan camera that uses the stage 110 to shoot the mother substrate 10 multiple times in a line scan manner, so that frame-by-frame images are taken of the entire inspection area of the mother substrate 10.

The camera 120 may include a high-resolution optical inspection system to detect defects in fine patterns of the mother substrate 10.

The image obtaining unit 132 may store the frames photographed by the camera. In the case of optical inspection of the line scan manner, as the mother substrate 10 to be inspected becomes larger, mechanical alignment err of the images of the frames according to a relative position of the camera 120 and the mother substrate 10 may occur. Further, according to the high-resolution optical inspection system, there may be a limitation of the size of each frame. As a result, a frame alignment error may occur, and an inspection error may occur due to such an error. In the present example embodiment, the errors may be minimized by using the frame matching unit and the correcting unit, which will be described below. A detailed description thereof will be described below.

The gray level extracting unit 134 may obtain gray level values of images of the respective frames. According to the present example embodiment, the images obtained in the image obtaining unit 132 are gray-valued, and the gray level values of the image for comparison inspection may be generated.

The frame matching unit 135 may search and match two frames that match each other among the frames. A plurality of alignment marks (MK in FIG. 2) may be formed on the mother substrate 10 for frame matching. Two frames having the same alignment mark may be matched with each other. According to the present example embodiment, the two frames are portions of the mother substrate 10 where the same pattern is formed, and defects of the patterns may be detected by comparing them. At this time, the two frames to be compared with each other may be matched with each other using the alignment mark, which is a specific mark formed on the mother substrate 10. For example, a template matching technique that is a digital image processing technique for finding a small portion of an image matching a template image may be utilized.

The correcting unit 136 may correct any one of the two frames in consideration of an alignment error and an image distortion between the two frames matched with each other. As described above, when the size of one frame is limited and a distance between the repeated patterns is large depending on a type of the circuit pattern of the display panel, the frame alignment error and difference due to image distortion between the two matched frames may occur as the distance between the two matched frames becomes longer.

Thus, when the mother substrate 10 having a repeated pattern with repetition period longer than the frame unit is inspected, alignment errors and image distortions may occur, which may be corrected by linear interpolation using the alignment mark on the mother substrate 10. A detailed description thereof will be described below with reference to FIG. 4.

The comparing unit 138 may compare the gray level values of the images of the two frames whose relative positions are corrected to determine whether a defect has occurred. For example, the comparing unit 138 may compare the gray level values of the images of the two frames whose relative positions are corrected, and then it may be determined that a defect has occurred in a portion having a gray level value larger than a preset threshold value.

The display panel inspection system may detect defects by obtaining images for each frame to be inspected in order to detect and analyze defects that may occur in each process during the manufacturing process of the display panel.

For example, according to the present example embodiment, the frame matching unit 135 may search for and match two frames that match each other among the frames using the alignment mark of the mother substrate 10. The correcting unit 136 may correct the relative position in consideration of the alignment error between the two matched frames. Accordingly, efficient inspection may be possible even when the size of the mother substrate 10 increases and long-period inspection for a plurality of cells arranged in a spaced (cell to cell inspection) results.

Figure 2:
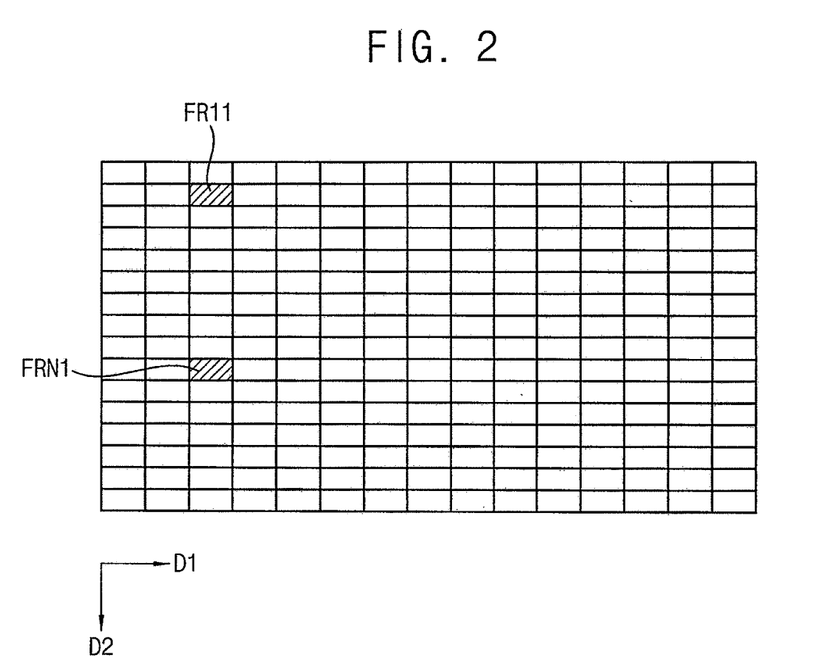
FIG. 2 illustrates a plan view schematically showing frames of a mother substrate 10 of FIG. 1.

FIG. 2 is a plan view schematically showing frames of a mother substrate 10 of FIG. 1.

According to the present example embodiment, referring to FIGS. 1 and 2, the mother substrate 10 to be inspected is larger than the size of one frame (one square grid in the drawing), and thus images of a plurality of frames are obtained in order to inspect the entire area of the mother substrate 10. Thus, the mother substrate 10 may be divided into a plurality of frames along the first direction D1 and the second direction D2, and an image corresponding to each frame may be obtained through the camera 120.

The plurality of frames shown in the figure are arranged in a matrix form along the first direction D1 and the second direction D2, and two frames including the same circuit pattern are selected and compared with each other. For example, a circuit pattern of a 1_1 frame FR11 and a circuit pattern of N_1 frame FRN1 positioned N-th from the 1_1 frame FR11 in the second direction D2 are repeated, and a plurality of frames may be located between circuit patterns that are repeated one another.

Figure 3:
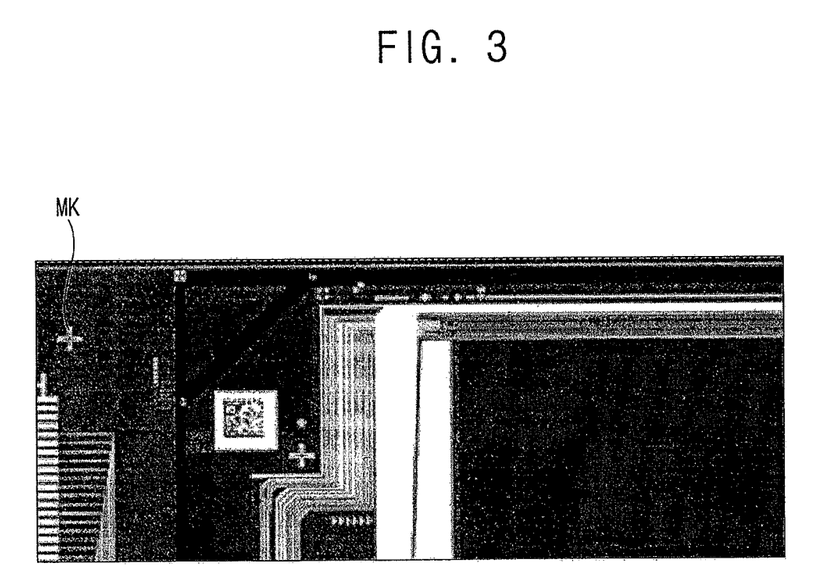
FIG. 3 illustrates a diagram showing an example of one frame in FIG. 2.

FIG. 3 is a diagram showing an example of one frame in FIG. 2.

Referring to FIG. 3, in one frame, an alignment mark MK for frame matching may be located. At least one alignment mark MK is located in one frame, and a shape of the alignment mark MK may vary. The alignment mark MK may have different shapes depending on the location of the mother substrate 10. However, frames having the same pattern compared with each other have alignment marks MK of the same shape.

Figure 4:
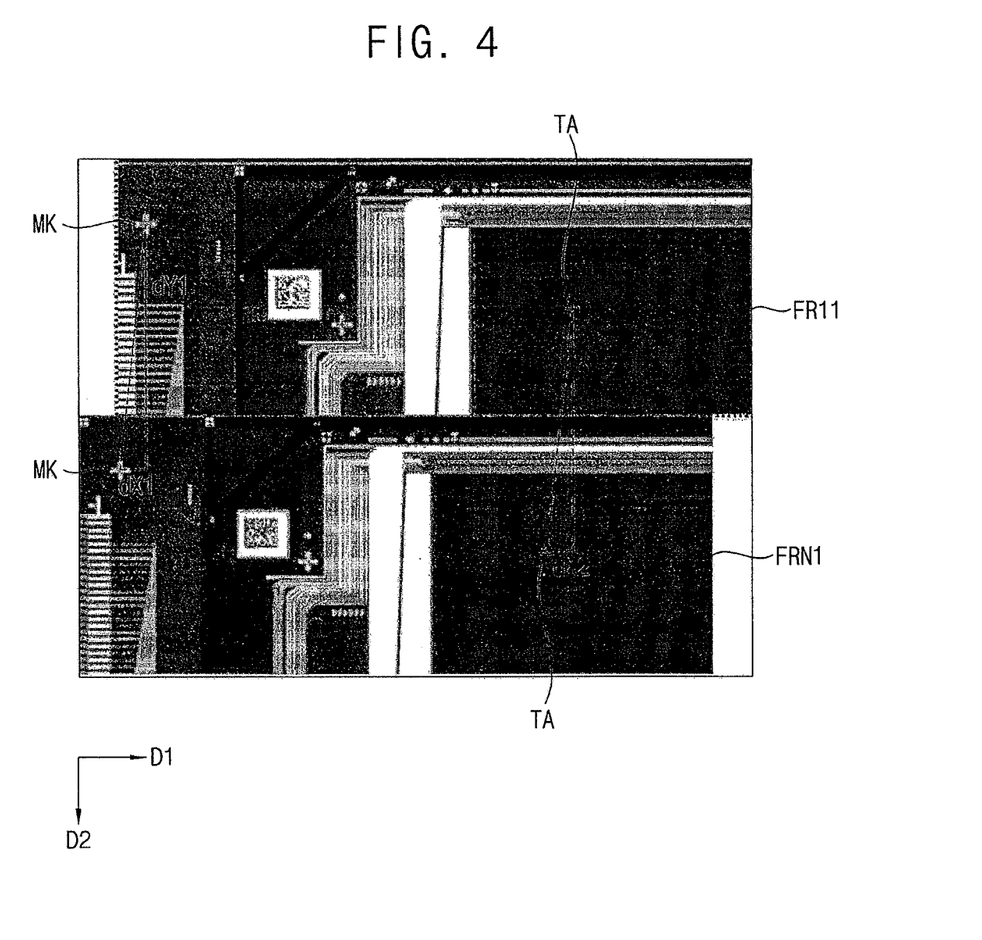
FIG. 4 illustrates a diagram showing a comparison between a 1_1 frame FR11 and the N_1 frame FRN1.

FIG. 4 is a diagram showing a comparison between a 1_1 frame FR11 and the N_1 frame FRN1.

Referring to FIG. 4, after the 1_1 frame FR11 and the N_1 frame FRN1 are matched, correction using the following linear interpolation may be performed.

Specifically, a distance dX1 between the 1_1 frame FR11 and the alignment mark MK of the N_1 frame FRN1 in the first direction (D1, x direction), and a distance dY1 between the alignment marks MK in the second direction (D2, y direction) are detected. A distance dY2 between two comparison points TA to be compared in the 1_1 frame FR11 and in the N_1 frame FRN1 in the second direction is detected. And then, by using the following equation, dX2 may be calculated.

A value of dX2 is a linear interpolated value using dY2, dX1 and dY1. Where the images of the 1_1 frame FR11 and the N_1 frame FRN1 do not exactly coincide with each other due to alignment errors and image distortions, the image of the N_1-th frame FRN1 may be corrected using the linearly interpolated value of dX2, not the measured value, as above.

$$dX2=(dY2*dX1)/dY1 \qquad \text{<Equation>}$$

(dX1: a distance in a first direction (X-direction) between the corresponding two alignment marks, dY1: a distance in a second direction (Y-direction) between the corresponding two alignment marks, dY2: a distance in the second direction between two comparison points in the frame, dX2: a correction amount in the first direction of one of the comparison points)

Thus, errors caused by alignment errors and image distortions between the frames of the display panel inspection system may be minimized, and defects may be accurately found.

For convenience of explanation, it is shown in the drawing that the 1_1 frame FR11 and the N_1 frame FRN1 are disposed adjacent to each other. An example embodiment includes detecting the dX1, dY1, dY2 and calculating the dX2 value in order to correct the alignment error and the image distortion in a state where the two frames are matched with each other.

Figure 5:
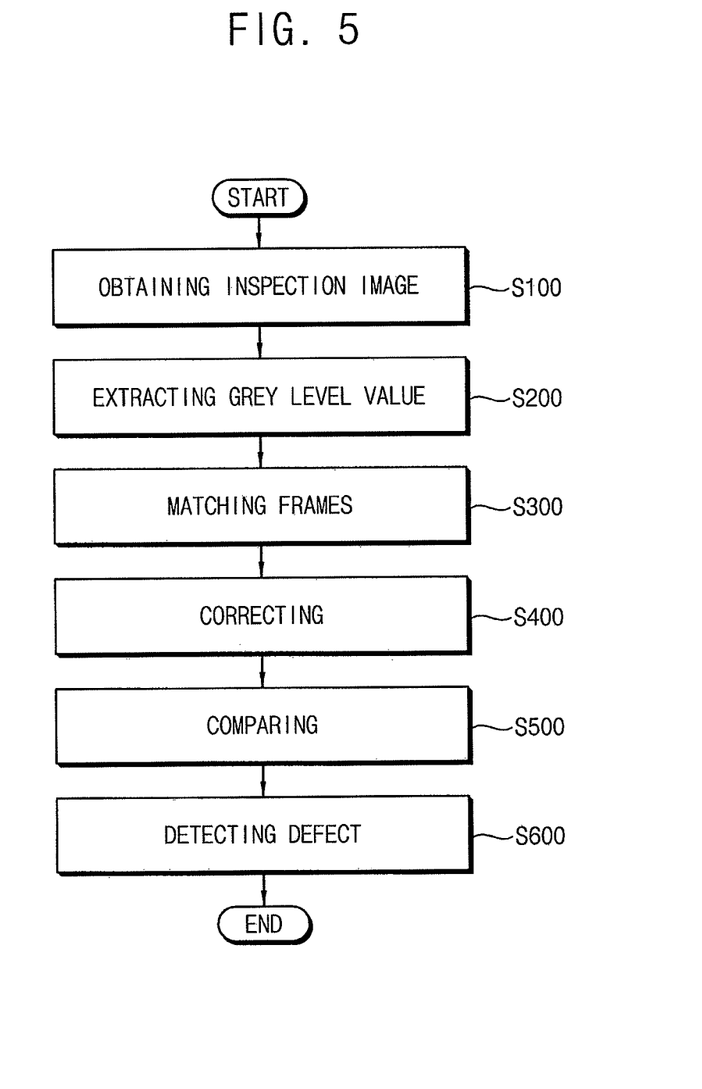
FIG. 5 illustrates a schematic diagram of a inspection method of a display panel according to an example embodiment.

FIG. 5 is a schematic diagram of a inspection method of a display panel according to an example embodiment.

Referring to FIGS. 1 to 5, the inspection method of a display panel may include obtaining inspection image (S100), extracting a grey level value (S200), matching frames (S300), correcting (S400), comparing (S500), and detecting defect (S600).

In obtaining inspection image (S100), a mother substrate to be inspected may be photographed frame-by-frame, and the respective image of frame may be stored. For example, the image of the mother substrate may be photographed using a camera of a line scan method, so that images of the frames may be stored.

In extracting the grey level value (S200), gray level values may be obtained by gray-scaling the image of each of the frames.

In matching frames (S300), two frames that match each other among the frames may be searched and matched. The mother substrate may be a substrate including a plurality of cells, and each of the cells may be cut to form one display panel. A plurality of alignment marks of various types may be formed on the mother substrate.

According to an example embodiment, the mother substrate is a substrate including a plurality of cells, and each of the cells may be cut to form one display panel. A plurality of alignment marks is arranged in one cell, and alignment marks in the one cell may have different shapes. In an example embodiment, a plurality of alignment marks is arranged in one cell, and alignment marks in the one cell may have different shapes.

If there is no periodicity of a circuit pattern to be inspected in one cell, a frame in one cell of the mother substrate and a frame in another cell may be matched with each other.

In correcting (S400), any one of the two frames that are matched with each other may be corrected in consideration of an alignment error and an image distortion between the two frames.

For example, a distance dX1 between an alignment mark of the first frame and an alignment mark of the second frame in a first direction (D1, x direction), and a distance dY2 between points to be compared in the first frame and the second frame. And then, by using the following equation, dX2 may be calculated.

A value of dX2 is a linear interpolated value using dY2, dX1 and dY1. Where the images of the first frame and the second frame do not exactly coincide with each other due to alignment errors and image distortions, the image of the second frame may be corrected using the linearly interpolated value of dX2, not the measured value, as above.

$$dX2=(dY2*dX1)/dY1 \qquad \text{<Equation>}$$

(dX1: a distance in a first direction (X-direction) between the corresponding two alignment marks, dY1: a distance in a second direction (Y-direction) between the corresponding two alignment marks, dY2: a distance in the second direction between two comparison points in the frame, dX2: a correction amount in the first direction of one of the comparison points)

Thus, errors caused by alignment errors and image distortions between the frames of the display panel inspection system may be minimized, and defects may be accurately found.

In comparing (S500), the gray level values of the corrected images of the two frames may be compared to determine whether a defect has occurred. For example, the gray level values of the images of the two frames may be compared to determine that a defect has occurred where a gray level value having a difference greater than a preset threshold value.

Figure 6:
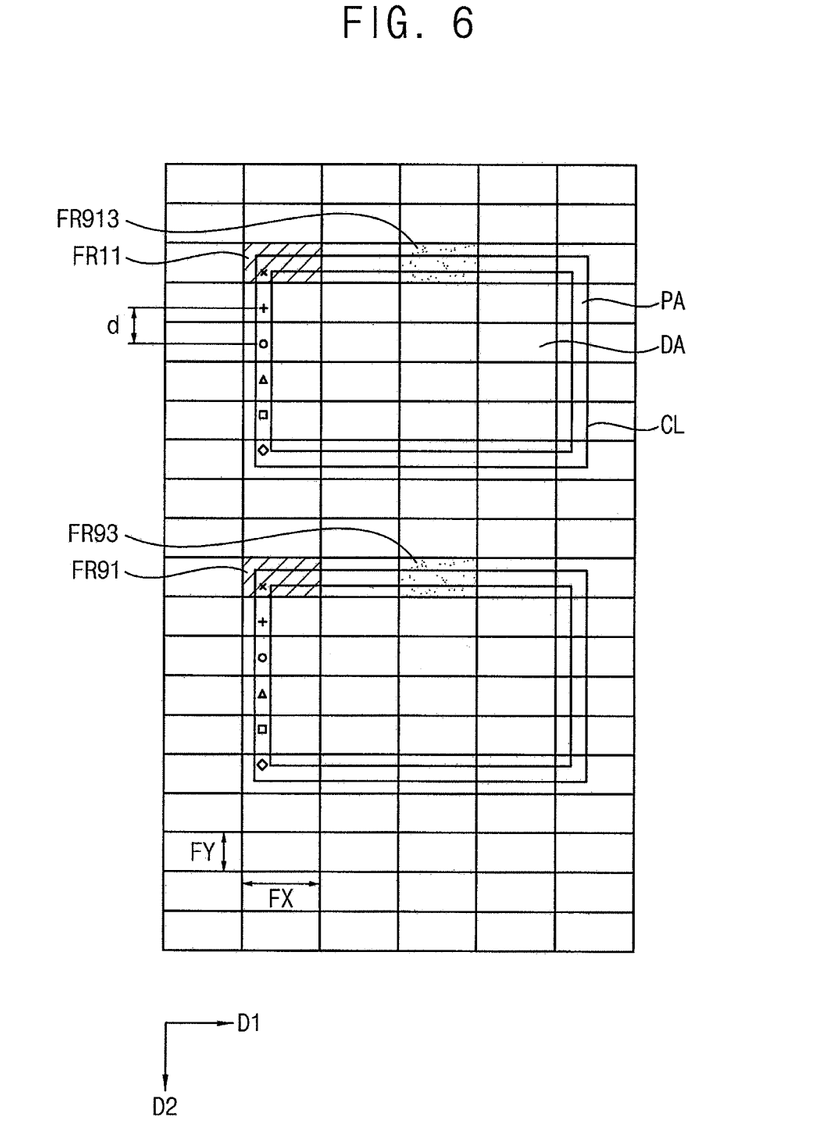
FIG. 6 illustrates a plan view showing cells on a mother substrate using a display panel inspection system and a display panel inspection method according to an example embodiment.
Figure 7:
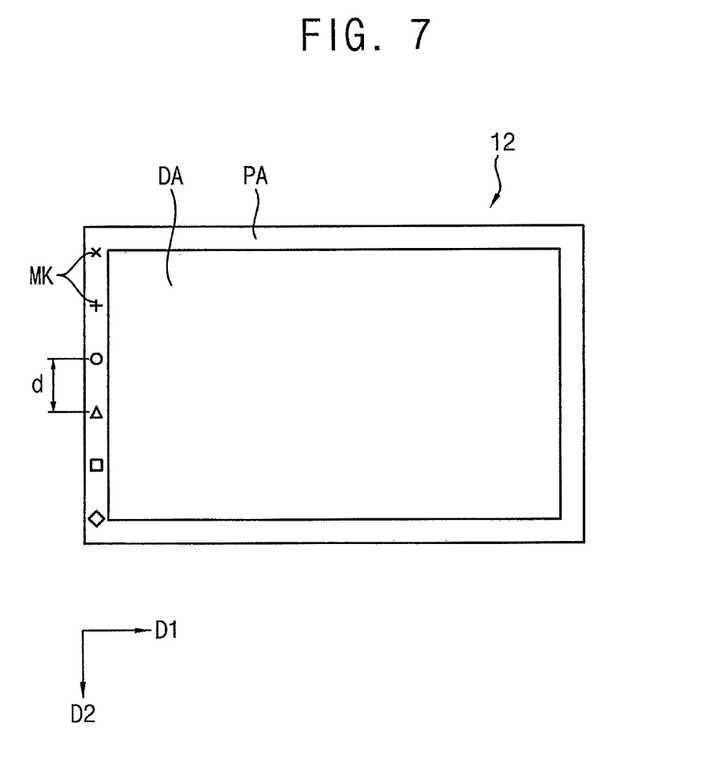
FIG. 7 illustrates a plan view showing the display panel 12 corresponding to one cell cut from the mother substrate of FIG. 6.

FIG. 6 is a plan view showing cells on a mother substrate using a display panel inspection system and a display panel inspection method according to an example embodiment. FIG. 7 is a plan view showing the display panel 12 corresponding to one cell cut from the mother substrate of FIG. 6.

According to the present example embodiment, referring to FIGS. 6 and 7, the mother substrate 10 includes a plurality of cells divided by a cutting line CL, and each of the cells may be cut along a cutting line CL to form one display panel.

For example, as shown in FIG. 6, the mother substrate 10 may be divided into a plurality of frames and include two cells. A 1_1 frame FR11 and the 9_1 frame FR91 may be compared with each other through the first display panel inspection system and the inspection method of the display panel. An alignment mark having the same shape may be placed in the 1_1 frame FR11 and the 9_1 frame FR91.

On the other hand, in the case of comparison between two frames without an alignment mark, for example, when a 1_3 frame FR13 and a 9_3 frame FR93 are matched and compared, correction may be performed using the correction amounts in the 1_1 frame FR11 and the 9_1 frame FR91 including the alignment mark among the adjacent frames.

Referring to FIG. 7 again, one display panel 12 may include a substrate on which a circuit pattern is formed, and a plurality of alignment marks MK arranged at predetermined intervals along a second direction D2 on the substrate. The display panel 12 may include a display area DA in which a plurality of pixels for displaying an image are arranged and a peripheral area PA which is a non-display area surrounding the display area DA. The alignment marks MK may be disposed in the non-display area and may have different shapes.

A distance d in the second direction D2 between the alignment marks MK may be equal to or less than a length FY of one frame in the second direction. Accordingly, along the second direction D2, at least one alignment mark may be located in one frame.

Here, alignment marks have the same shape where the repeated portions of the circuit pattern. When there are no repeated portions as in the drawing, different types of alignment marks may be formed.

Embodiments may be applied to an organic light emitting display and various electronic apparatuses including the same. For example, the embodiments may be applied to a mobile phone, a smart phone, a video phone, a smart pad, a smart watch, a tablet PC, a car navigation system, a television, a computer monitor, a notebook, head mount displays, and so on.

By way of summation and review, in manufacturing a display panel of a display apparatus, an automatic optical inspection apparatus may be used to detect defects of the display panel. In general, the automatic optical inspection apparatus may compare a manufactured display panel with a standard image to determine whether the display panel is defective. However, if the photographed image is distorted or misaligned in accordance with the inspection condition but the display panel is not defective, the display panel may be judged to be defective due to a difference from the standard image, resulting in poor inspection accuracy.

As described above, embodiments relate a display panel inspection system capable of improving inspection accuracy, an inspection method of a display panel, and a display panel manufactured using the display panel inspection system and the inspection method.

Embodiments may provide a display panel inspection system and an inspection method of a display panel are provided. A mother substrate to be inspected may be photographed frame-by-frame. Two frames that match each other may be searched and matched. Any one of the two frames may be corrected in consideration of an alignment error and an image distortion between the two frames matched with each other. Thus, errors caused by alignment errors and image distortions between the frames of the display panel inspection system may be minimized, and defects may be accurately found.

In the claims, any means-plus-function clauses are intended to cover the structures described herein as performing the recited function and not only structural equivalents but also equivalent structures.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display panel inspection system, comprising:
   a camera to image respective frames of a mother substrate in a frame-by-frame manner;
   a stage to move the mother substrate relative to the camera; and a processor configured to:
store frames imaged by the camera;
obtain gray level values of the frames;
search a first frame and a second frame that matches the first frame among the frames imaged by the camera;
perform correction on the second frame in consideration of an alignment error and an image distortion between the first and second frames; and
compare, after the correction, the gray level values of the first frame and the second frame to detect a defect in the second frame of the mother substrate.

2. The display panel inspection system as claimed in claim 1, wherein the camera is a line scan camera, and is configured to obtain a plane image of the mother substrate, so that a plurality of frames are photographed by the camera so as to correspond to an entire inspection region of the mother substrate.

3. The display panel inspection system as claimed in claim 2, wherein the processor is configured to generate the gray level values by gray-valuing the stored image frames.

4. The display panel inspection system as claimed in claim 3, wherein the processor is configured to match the first and second frames that include a same alignment mark among a plurality of alignment marks on the mother substrate.

5. The display panel inspection system as claimed in claim 4, wherein the processor is configured to compare the gray level values of the first and the second frames and to determine whether a defect has occurred in a portion of a frame having a gray value having a difference larger than a predetermined threshold value.

6. The display panel inspection system as claimed in claim 1, wherein:
the mother substrate is a substrate that includes a plurality of cells, each of the cells being cut to form one display panel, and
a plurality of alignment marks are formed in one cell, and the alignment marks in the one cell have different shapes.

7. The display panel inspection system as claimed in claim 1, wherein the processor is configured to correct the second frame and the image distortion by linear interpolation using an alignment mark on the mother substrate.

8. The display panel inspection system as claimed in claim 7, wherein the processor is configured to use the following equation:

$$dX2=(dY2*dX1)/dY1 \qquad <\text{Equation}>$$

wherein,
dX1 is a distance in a first direction (X-direction) between two corresponding alignment marks,
dY1 is a distance in a second direction (Y-direction) between two corresponding alignment marks,
dY2 is a distance in the second direction between two comparison points in the first frame and the second frame, and
dX2 is a correction amount in the first direction of one of the two comparison points.

9. A method of inspecting a display panel, the method comprising:
an inspection image obtaining operation, which includes photographing a mother substrate to be inspected frame-by-frame, and storing images of frames which are photographed;
a gray level value extracting operation, which includes obtaining gray level values by gray-scaling the image of each of the frames;
a frame matching operation, which includes searching for a second frame that matches a first frame among the frames;
a correcting operation, which includes correcting the second frame in consideration of an alignment error and an image distortion between the first and second frames; and
a comparing operation, which includes determining, after the correcting operation, whether a defect has occurred by comparing the gray level values of the first frame and the second frame.

10. The method as claimed in claim 9, wherein a plurality of alignment marks having various shapes are formed on the mother substrate.

11. The method as claimed in claim 9, wherein in the frame matching operation, the first and second frames including alignment marks having a same shape are matched.

12. The method as claimed in claim 11, wherein in the comparing operation, the gray level values of the images of the first and second frames are compared to determine that the defect has occurred where a gray level value has a difference greater than a preset threshold value.

13. The method as claimed in claim 9, wherein the inspection image obtaining operation includes using a camera to photograph the mother substrate in a line scan manner.

14. The method as claimed in claim 9, wherein:
the mother substrate is a substrate that includes a plurality of cells, and each of the cells is cut to form one display panel, and
a plurality of alignment marks is formed in one cell, and the alignment marks in the one cell have different shapes.

15. The method as claimed in claim 9, wherein, in the frame matching operation, a frame in one cell of the mother substrate and a frame in another cell of the mother substrate are matched with each other.

16. The method as claimed in claim 14, wherein in the frame matching operation, the first and second frames in one cell of the mother substrate are matched with each other.

17. The method as claimed in claim 9, wherein in the correcting operation, the following equation is used to correct:

$$dX2=(dY2*dX1)/dY1 \qquad <\text{Equation}>$$

wherein:
dX1 is a distance in a first direction (X-direction) between two corresponding alignment marks,
dY1 is a distance in a second direction (Y-direction) between the two corresponding alignment marks,
dY2 is a distance in the second direction between two comparison points in the first frame and the second frame, and
dX2 is a correction amount in the first direction of one of the two comparison points.

18. A display panel, comprising:
a substrate on which a circuit pattern including a first portion and a second portion is formed in a plan view; and
a plurality of alignment marks arranged at predetermined intervals along a first direction on the substrate on each of the first portion and the second portion in the plan view.

19. The display panel as claimed in claim 18, wherein the plurality of alignment marks are of a same shape when the second portion is a repeated pattern of the first portion.

20. The display panel as claimed in claim 18, wherein the plurality of alignment marks are not of a same shape when the second portion is not a repeated pattern of the first portion.

* * * * *